(12) United States Patent
Lazarovich et al.

(10) Patent No.: US 7,177,125 B2
(45) Date of Patent: Feb. 13, 2007

(54) ARC FAULT DETECTION FOR SSPC BASED ELECTRICAL POWER DISTRIBUTION SYSTEMS

(75) Inventors: David Lazarovich, Thornhill (CA); Ileana Rusan, Toronto (CA); David Knight, Oakville (CA)

(73) Assignee: Honeywell International Inc., Morristown, NJ (US)

( * ) Notice: Subject to any disclaimer, the term of this patent is extended or adjusted under 35 U.S.C. 154(b) by 368 days.

(21) Appl. No.: 10/365,371

(22) Filed: Feb. 12, 2003

(65) Prior Publication Data

US 2004/0156154 A1    Aug. 12, 2004

(51) Int. Cl.
*H02H 3/00* (2006.01)
(52) U.S. Cl. ............................................. 361/42; 361/2
(58) Field of Classification Search ............ 361/42–50, 361/93.7, 93.8, 93.9, 2; 702/58
See application file for complete search history.

(56) References Cited

U.S. PATENT DOCUMENTS

| | | | | |
|---|---|---|---|---|
| 5,455,731 A | * | 10/1995 | Parkinson | ............... 361/71 |
| 5,550,751 A | | 8/1996 | Russell | |
| 5,752,047 A | * | 5/1998 | Darty et al. | .............. 713/300 |
| 5,777,894 A | * | 7/1998 | Settles et al. | ............. 700/295 |
| 5,834,940 A | | 11/1998 | Brooks et al. | |
| 5,835,319 A | | 11/1998 | Welles, II et al. | |
| 5,835,321 A | | 11/1998 | Elms et al. | |
| 5,986,860 A | | 11/1999 | Scott | |
| 6,034,611 A | | 3/2000 | Brooks et al. | |
| 6,052,046 A | | 4/2000 | Ennis et al. | |
| 6,259,996 B1 | | 7/2001 | Haun et al. | |
| 6,268,989 B1 | | 7/2001 | Dougherty et al. | |
| 6,522,509 B1 | * | 2/2003 | Engel et al. | ............... 361/42 |
| 6,525,918 B1 | * | 2/2003 | Alles et al. | ............... 361/93.1 |
| 6,625,550 B1 | * | 9/2003 | Scott et al. | ............... 702/58 |
| 2001/0029433 A1 | | 10/2001 | Scott | |
| 2002/0008950 A1 | | 1/2002 | Kim et al. | |
| 2002/0024782 A1 | | 2/2002 | Kim et al. | |
| 2002/0033701 A1 | | 3/2002 | Macbeth et al. | |

FOREIGN PATENT DOCUMENTS

GB          2 348 751 A      10/2000

* cited by examiner

*Primary Examiner*—Brian Sircus
*Assistant Examiner*—Danny Nguyen
(74) *Attorney, Agent, or Firm*—Birch, Stewart, Kolasch & Birch, LLP

(57) ABSTRACT

An apparatus and a method detect arc faults in an electrical power distribution system of a vehicle. In one implementation, the apparatus (320) includes: a load current input (340) arranged to obtain a measurement of current being supplied to a load (140) via a solid state power switching device (310) of the electrical power distribution system; and an arc fault detector (330) arranged to compare the measured load current with a load signature, the load signature being a function of characteristics of the load (140) being supplied current via the solid state power switching device (310) and operating conditions of the solid state power switching device (310). The arc fault detector (330) outputs an arc fault indication signal when the measured current is outside an allowable range of the load signature to provide protection against arc faults.

15 Claims, 6 Drawing Sheets

ARC FAULT DETECTION FOR SSPC BASED ELECTRICAL POWER DISTRIBUTION SYSTEMS

FIELD OF THE INVENTION

The present invention relates to electrical power distribution, and more particularly to arc fault detection/protection in a solid state power controller (SSPC) based power distribution system.

BACKGROUND OF THE INVENTION

Unwanted electrical arcs have been identified as a major cause of fires in residential and commercial electrical wiring as well as in electrical power distribution systems for aircraft and other vehicles. An electrical arc fault is defined as electrical current through a gas in a broken or disconnected circuit. The disconnected circuit can be between two deteriorated conductors, between one deteriorated conductor and ground plane (parallel arc) or between adjacent ends of a conductor (series arc). Arc fault conditions may be attributed to a variety of causes, such as damage to wiring, insulation, or contacts due to age, heat, chemical erosion, bending stress, etc.

Although conventional short circuit and overcurrent protection techniques, which typically rely on mechanical circuit breakers to interrupt circuit flow under certain conditions, react to some arc faults, they offer little protection for small arcing events below the trip curves of the standard circuit breakers. The concern is that even small arcs can develop high temperatures and cause serious damage to adjacent wiring. Furthermore, although ground-fault circuit interrupters (GFCIs) have been widely used in buildings to protect against even low-current line-to-ground arc faults, GFCIs do not protect against other types of arc faults and have limited applicability. For this reason, more complex techniques, including electrical-based arc fault circuit interrupters, have been proposed for use in residential and commercial buildings to detect and react to low current arc faults while minimizing unwanted trips ("nuisance trips") and should be immune to load switching conditions, bus transfers, electromagnetic interference (EMI), etc.

Particularly in aerospace power distribution systems, there has been a shift from predominantly mechanical or electromechanical control to predominantly electronic and computer-based control. This shift has resulted in advanced power distribution controllers, such as Electric Load Management Centers (ELMCs) and the use of solid state switching control (SSPC) technology, which is a relative newcomer in aerospace power distribution systems. Current SSPC technology, which typically performs only short circuit and overload protection for the attached circuitry, does not provide adequate protection against parallel or series arc faults and, thus, does not provide adequate protection against arc faults occurring downstream of the SSPC-fed circuitry to load. Arc signature based fault protection would have drawbacks if implemented in an SSPC based electrical power distribution environment because the detection algorithm would require complex measures to avoid nuisance trips under various load conditions, switching conditions, etc.

SUMMARY OF THE INVENTION

The present invention is directed to an apparatus and a method for arc fault protection in an electrical power distribution system of a vehicle. The present invention is particularly applicable to protect against faults occurring downstream of an SSPC, which selectively provides electrical power to an associated load. An SSPC distribution system has the advantage of having in its internal control circuitry the information about the load connected at its output—load signature (load current at steady state, start up, shut down, switching events, etc.). This data (load signature) can be either pre-stored in memory or determined when installed in the vehicle by a process of "learning." Such learning may be achieved through successive testing and storage of results in memory. Such testing may be performed to determine the steady state load current waveform, start up and shut down, characteristic signatures. An arc fault detector according to one implementation of the present invention is designed to compare measured load current with the reference load current (load signature) stored in memory. The load signature determined is typically quite unique with some variations caused by the operating conditions, fixed or variable frequency power, etc.

The arc fault detector outputs an arc fault indication signal when the measured current is outside an allowable range of the load signature. In this way, the controller of the solid state switching device can command the switching device to cut off power to the associated load when an arc fault occurs downstream of the switching device. Furthermore, because the arc fault detector detects arc faults as a function of the associated load characteristics, switching conditions, and characteristics of the associated power channel (e.g., EMI, inrush current, load OFF), nuisance trips are avoided during transient conditions and other expected load current fluctuations.

In one exemplary embodiment of the present invention, each switching control unit, which controls an associated switching device performs arc fault detection for the corresponding load (i.e., a one-to-one correspondence). In an alternative embodiment, a dedicated arc fault detection unit detects arc faults associated with a plurality of loads. In both exemplary implementations of the present invention, the arc fault detector may undergo an initial "learning" process to determine load current waveforms/levels under various conditions.

BRIEF DESCRIPTION OF THE DRAWINGS

Other aspects and advantages of the present invention will become apparent upon reading the following Detailed Description and upon reference to the drawings, in which.

DETAILED DESCRIPTION

Figure 1:
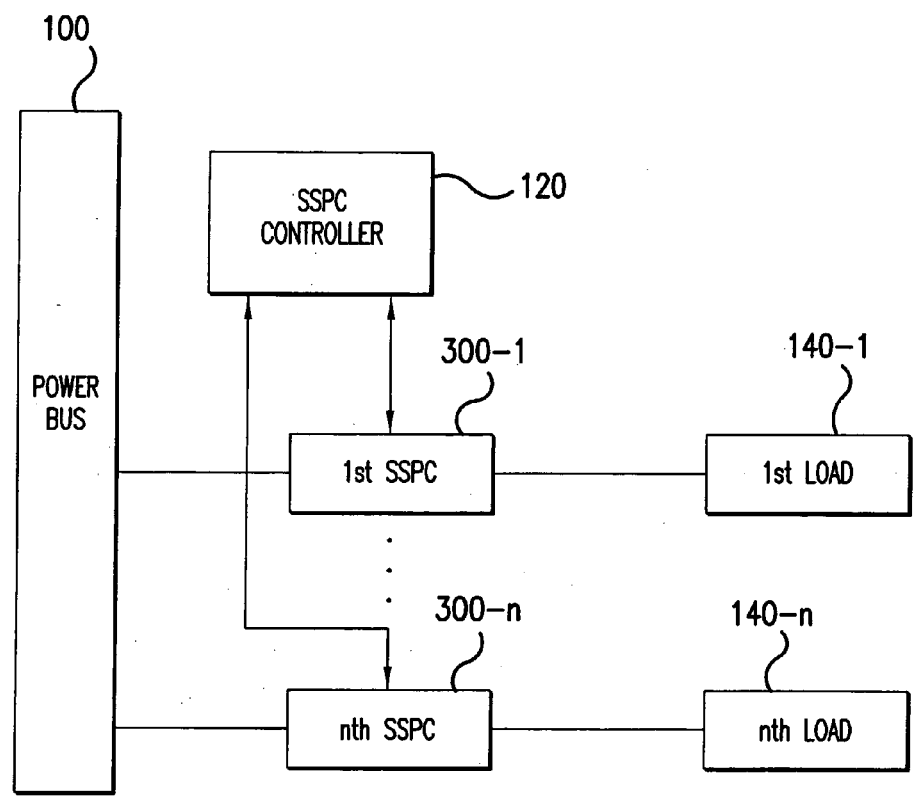
FIG. 1 is a general block diagram illustrating elements of an SSPC based power distribution system to which principles of the present application may be applied.

FIG. 1 illustrates, in block diagram form, elements of an exemplary SSPC based power distribution system to which principles of the present invention may be applied to achieve arc fault protection. The exemplary power distribution system illustrated in FIG. 1 includes: a power bus 100; a plurality of SSPC units 300-1 to 300-n; a plurality of loads 140-1 to 140-n, respectively connected to SSPC units 300-1 to 300-n; and an SSPC controller 120. The power bus 100 may provide either AC or DC power for distribution to components (i.e., loads) of an aircraft or some other vehicle. Each SSPC unit 300-1 to 300-n is a solid state switching device connected to the power bus 100 to selectively provide rated electrical power to one of loads 140-1 to 140-n (e.g., pumps, lights, etc.) based on instructions received from the SSPC controller 120. The power distribution system illustrated in FIG. 1 may be implemented as part of an ELMC (Electrical Load Management Center) of a vehicle and may be implemented in various levels of integration, for example using a modular architecture such as described in co-pending application Ser. No. 10/017,125, filed Dec. 14, 2001. In such a system, the SSPC controller 120 is a functional element, which generates switching control signals to be distributed to the plurality of SSPC units 300-1 to 300-n based on control information received via a gateway module from a centralized vehicle computer (not shown). In addition to distributing switching control signals, the SSPC controller 120 may gather testing, monitoring, and reporting information from the plurality of SSPC units 300-1 to 300-n, for example to monitor and report failed switching devices and various other fault conditions of the electrical distribution system, including short circuit, overcurrent and arc fault conditions described in more detail below.

Figure 2:
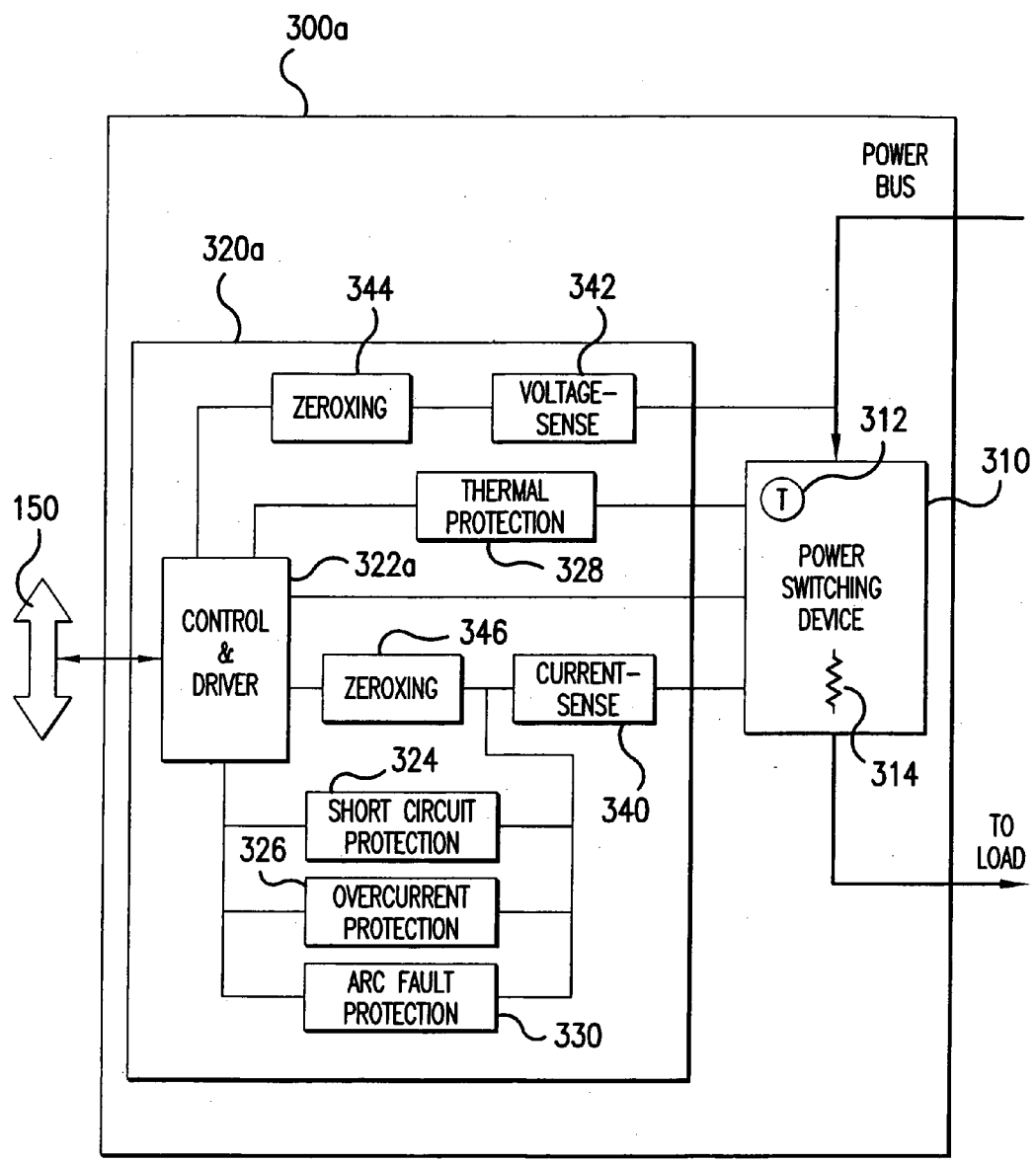
FIG. 2 is a block diagram illustrating details of SSPC based power switching, short circuit/over current and arc fault protection device in accordance with an embodiment of the present application.

FIG. 2 illustrates an exemplary configuration of an SSPC unit 300a in accordance with an exemplary embodiment of the present invention. As shown in FIG. 2, the SSPC unit 300a of this exemplary embodiment includes two main components: a power switching device 310; and a switching control and protection device 320a. The power switching device 310, which may be, for example, a MOSFET transistor is coupled to the power bus 100 to selectively provide power to an associated load under control of the switching control and protection device 320a. The power switching device 310 shown in FIG. 2 includes a temperature sensor 312 for providing thermal condition information to the switching control and protection device 320a and a sense resistor 314 for providing a load current measurement to the switching control and protection device 320a. The switching control and protection device 320a includes a control/driver unit 322a for selectively opening/closing the power switching device 310 in accordance with switching commands received from the SSPC controller unit 120 via a data bus 150 and in accordance with locally determined conditions. More specifically, the switching control and protection device 320a includes a current sensor 340 for measuring output current of the power switching device 310 based on the current at the sense resistor 314 of the power switching device 310, the measured current being provided to a zero current crossing detector 346 (when the electrical power supplied at the power bus 100 is AC electrical power), a short circuit protection unit 324, an overcurrent protection unit 326, and an arc fault protection unit 330.

The short circuit and overcurrent protection units 324, 326 may perform well known short circuit/overcurrent detection, for example based on an I²t trip curve. The arc fault protection unit 330 performs arc fault detection in a manner described in more detail below. The controller/driver 322a is connected to each of the short circuit protection unit 324, the overcurrent protection unit 326, and the arc fault protection unit 330 to disable (i.e., trip), the power switching device 310 when a short circuit condition, an overcurrent condition, or an arc fault condition occurs, and reports fault conditions to the SSPC controller 120 via the data bus 150. The switching control and protection device 320a further includes a thermal protection circuit 328 for sensing excessive heat of the power switching device 310, as indicated by the temperature sensor 312 of the power switching device 310. The controller/driver 322a is connected to the output of the thermal protection circuit 328 so as to selectively disable the powerswitching device 310 upon occurrence of an excessive thermal condition. In an AC power environment, the switching control and protection device 320a further includes a voltage sensor 342, connected to an input of the power switching device 310, and a zero voltage crossing detector 340 for detecting zero voltage crossings based on the output of the voltage sensor 342. In the AC electrical power environment, the controller/driver 322a controls opening/closing of the power switching device 310 in accordance with zero voltage crossing detected by the zero voltage crossing detector 342 and zero current crossing indicated by the zero current crossing detector 346.

Although the block diagram of FIG. 2 illustrates functional components of the switching control and protection device 320a as discrete elements, it should be realized that various functional elements illustrated in FIG. 2 may be combined in a single processing element, such as a microcomputer with associated memory, or may be distributed among a plurality of processing elements. The switching control and protection device 320a may be implemented as one or more application specific integrated circuits (ASICs), or may be implemented in various combinations of hardware and software. Furthermore, for use in a modular architecture of an ELMC, the SSPC unit 300a may be grouped with SSPCs for a plurality of loads on a single card of a load management module. Furthermore, additional elements may be included with the physical implementation of the SSPC unit 300a illustrated in FIG. 2, and/or certain elements may be removed.

Figure 3:
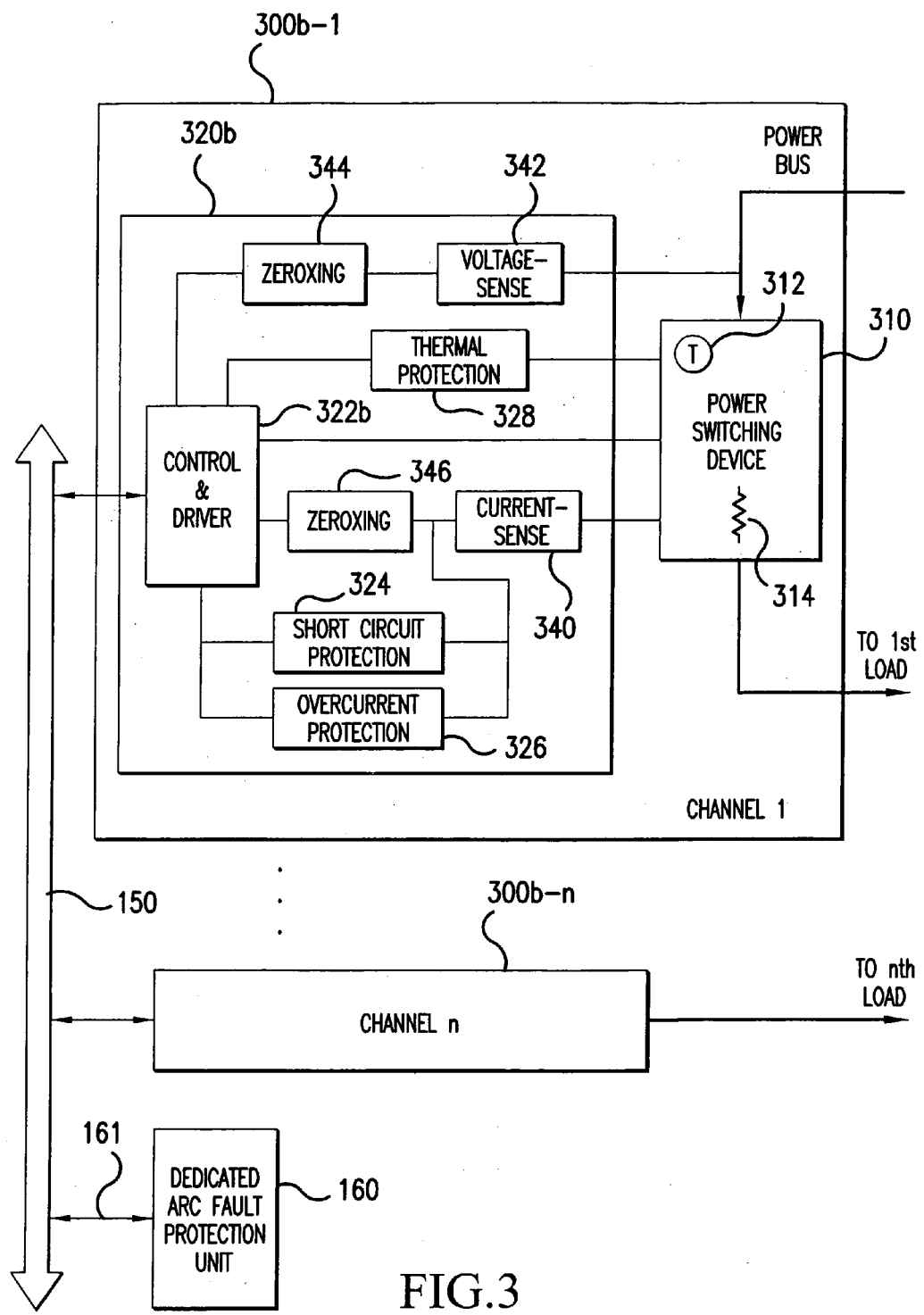
FIG. 3 is a block diagram illustrating an alternative configuration for SSPC based power switching and arc fault protection in accordance with an embodiment of the present invention.

FIG. 3 illustrates an alternative embodiment for power switching and arc fault protection in accordance with principles of the present invention. In the alternative embodiment illustrated in FIG. 3, an SSPC unit 300b comprises the power switching device 310; and a switching control and protection device 320b. As compared to the switching control and protection device 320a for the embodiment of the present invention shown in FIG. 2, the switching control and protection device 320b shown in FIG. 3 does not include an arc fault protection unit (i.e., there is no one-to-one correspondence between SSPC unit and arc fault detector). Instead, a dedicated arc fault protection unit 160, connected to the data bus 150 via an input 161, monitors the total load current supplied to a plurality of load channels 1 to n. More specifically, the dedicated arc fault protection unit 160 measures the total load current passed to the plurality of channels (300b-1 to 300b-n) and also receives load current information from each of the attached channels. In one implementation, the arc fault protection unit 160 receives current information from a current sensor (e.g., current transformer, not shown) located on the feed line that feeds the power bus 100 shown in FIG. 1. This allows the arc fault protection unit 160 to acquire information on the total current fed to the plurality of loads. The arc fault protection unit 160 is able to process the total current information with an elevated degree of accuracy and resolution. Upon detection of an anomaly in the total transferred current, the arc fault protection unit 160 detects which one of the channels 300b-1 to 300b-n has reported an abnormal current. By association, the arc fault protection unit 160 will trip the circuit, which exhibited the arc fault symptoms. In this embodiment, the dedicated arc fault protection unit 160 may be implemented as an ASIC, a micro-controller or as a combination of hardware/software. Also, the dedicated arc fault protection unit 160 may be a functional element of the SSPC controller 120 or some other element of the electrical power distribution system.

Figure 4:
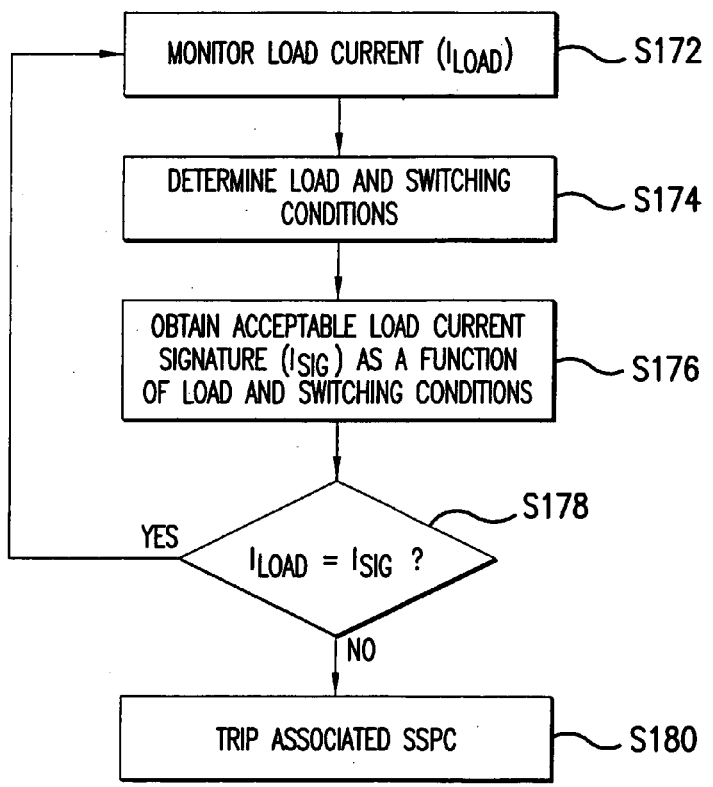
FIG. 4 is a flow diagram illustrating an arc fault protection technique in accordance with principles of the present invention.
Figure 5A:
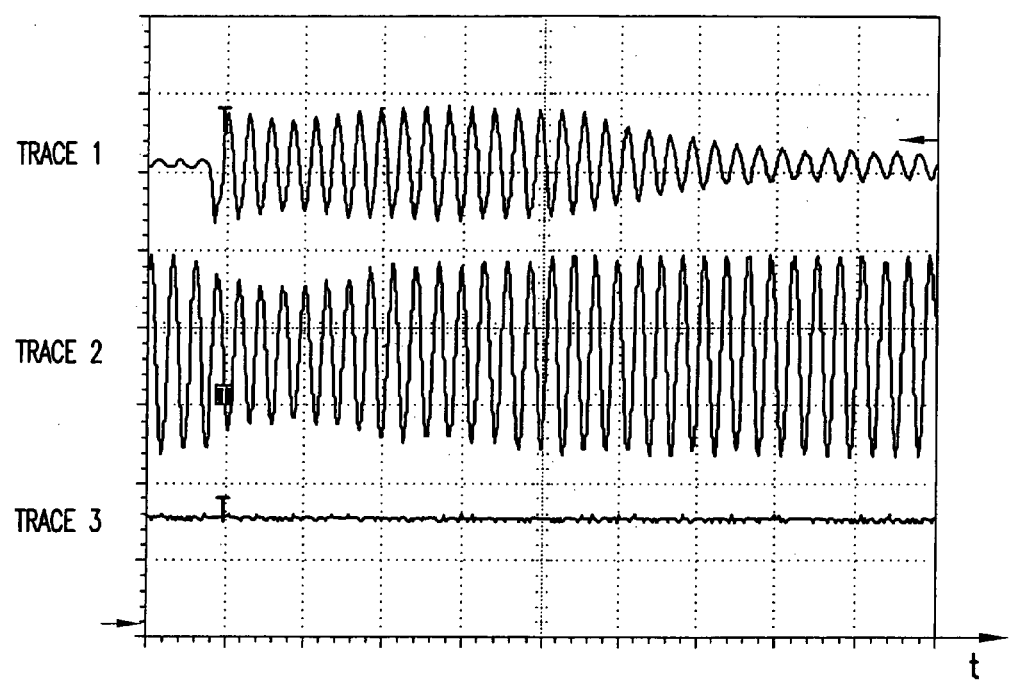
FIG. 5A illustrates an exemplary load current under a normal (no arc fault) load current condition.
Figure 5B:
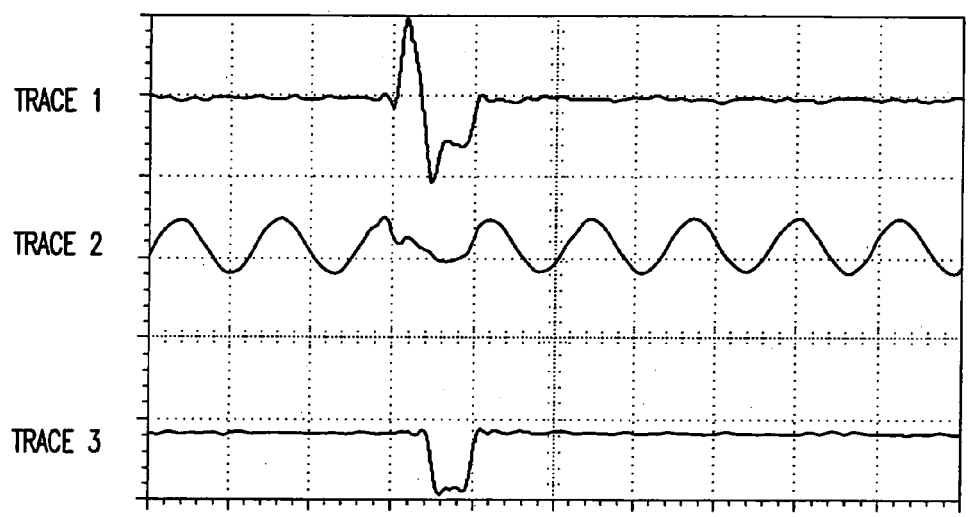
FIG. 5B illustrates an arc fault condition in the same circuit which is identified by the detection circuit as an arc fault, in accordance with principles of the present invention.

FIG. 4 is a flow diagram illustrating arc fault protection in accordance with principles of the present application. The functions of the flow diagram illustrated in FIG. 4 may be, for example, implemented in the dedicated arc fault protection unit 160 of the embodiment illustrated in FIG. 3 or in each individual SSPC unit 300-1 to 300-n, as shown in FIG. 2. Again, it should be recognized that dedicated arc fault protection unit 160 may be a functional unit of the SSPC controller 120 or some other element of the electrical power distribution system. In accordance with the present invention, an undesired arc fault condition is detected based on a comparison of load currents and acceptable load signatures. As an example, FIGS. 5A–5B depict two cases of load current. FIG. 5A shows a normal inrush current during the start up of a three phase motor. In FIG. 5A, it can be noticed that the output of the arc detection circuit (shown in Trace 3) does not react to the sudden inrush of current (shown in Trace 1), due to the fact that the load signature is recognized by the arc fault protection unit. Trace 2 of FIG. 5A illustrates the bus voltage for the normal load current condition of FIG. 5A. FIG. 5B shows the case of an actual arc fault current. The load current waveform (Trace 1) is not recognized by the unit and, therefore, a trip signal is generated (Trace 3) disconnecting the SSPC. Trace 2 of FIG. 5B illustrates the bus voltage for the arc fault condition of FIG. 5A.

The inventors of the present application have found that, unlike an arc signature, a load signature is typically unique, with some variations caused by the operating conditions, fixed or variable frequency power, characteristics of the load itself, etc. These variations can be defined in an allowable band of a load signature, stored in the logic/processing circuitry of the distribution system. Furthermore, this information can be derived from an existing "library" of loads available from the load manufacturer. Furthermore, load signatures may be taught during a learning process, in which the arc fault protection circuitry determines characteristics of the various loads and operating conditions (e.g., inrush, steady state and transients). This may take place automatically when loads are switched on/off or during various other steady state and transient operation events.

To achieve arc fault protection in accordance with the present invention, the current output to each of the plurality of loads, $I_{load}$, is monitored (S172). Furthermore, switching conditions for each load (i.e., whether an associate power switching device 310 is turned on and for what length the power switching device has been turned on) and characteristics of the load are determined (S174). Steps S172 and S174 may be reversed in order or performed concurrently. Next, an acceptable load current signature, $I_{sig}$, is determined as a function of load and switching conditions, for example by retrieving a load signature from a "library" of loads (S176) and $I_{load}$ is compared to $I_{sig}$ to determine whether the measured load current is within acceptable limits. If $I_{load}$ is not within acceptable limits of $I_{sig}$, the associated power switching device is disabled due to an arc fault condition (S180). Acceptable limits may be determined through testing.

Although the acceptable load signature will vary depending on numerous factors, detecting arc fault conditions based on load signature takes advantage of switching information obtained from the SSPC controller unit 120 and characteristics of the associated load so that nuisance trips can be avoided. More specifically, the load signature used to determine arc faults will take into account the switching state of the power switching device, thereby avoiding switching trips due to transient or noise conditions of the power distribution channel.

We claim:

1. An apparatus for arc fault protection in an electrical power distribution system of a vehicle, said power distribution system including a plurality of solid state power switching devices for switching on/off power to corresponding loads and further including a solid state power switching device controller for distributing switching control signals to said solid state power switching devices, said apparatus comprising:

a load current input arranged to obtain a measurement of current being supplied to a load via a solid state power switching device of said electrical power distribution system;

a load signature input arranged to obtain reference steady state and transient characteristics of the load supplied current waveforms, thereby obtaining a load signature, said load signature being a function of characteristics of said load being supplied current via said solid state power switching device and operating conditions of said solid state power switching device; and an arc fault detector arranged to determine a switching state of said solid state power switching device and to compare said measured load current with said load signature as a function of the determined switching state of said solid state power switching device, said arc fault detector outputting an arc fault indication signal when said measured current is outside an allowable range of said load signature.

2. The apparatus according to claim 1, wherein said load signature is a function of a switching state of said solid state power switching device, such that said load signature tracks transient conditions of said electrical power distribution system.

3. The apparatus according to claim 1, wherein said load signature is a function of the type of power being supplied to said load via said solid state switching device.

4. An apparatus for arc fault protection in an electrical power distribution system of a vehicle, said apparatus comprising:

a load current input arranged to obtain a measurement of current being supplied to a load via a solid state power switching device of said electrical power distribution system;

a load signature input arranged to obtain reference steady state and transient characteristics of the load supplied current waveforms, thereby obtaining a load signature, said load signature being a function of characteristics of said load being supplied current via said solid state power switching device and operating conditions of said solid state power switching device; and an arc fault detector arranged to compare said measured load current with said load signature, said arc fault detector outputting an arc fault indication signal when said measured current is outside an allowable range of said load signature, wherein said load current input is arranged to obtain a measurement of current being supplied to a plurality of loads via corresponding solid state switching devices; and said arc fault detector compares total measured load current with the load signature, which is a function of characteristics of said plurality of loads, and, at the detection of an anomaly, determines which one of the attached solid state switching devices reports an abnormal current to disconnect the relevant affected circuit.

5. The apparatus according to claim 1, wherein said electrical power distribution system is an aerospace electrical power distribution system.

6. The apparatus according to claim 1, wherein said arc fault detection apparatus is implemented as an application specific integrated circuit.

7. The apparatus according to claim 1, wherein said arc fault detector is arranged to determine transient and steady state characteristics of said load during an initialization process so as to determine said load signature.

8. The apparatus according to claim 1, wherein said arc fault detector is pre-programmed with said load signature.

9. A method for protecting against arc faults in an electrical power distribution system of a vehicle, said power distribution system including a plurality of solid state power switching devices for switching on/off power to corresponding loads and further including a solid state power switching device controller for distributing switching control signals to said solid state power switching devices, said method comprising:

obtaining a measurement of current being supplied to a load via a solid state power switching device of said electrical power distribution system;

obtaining reference steady state and transient characteristics of the load supplied current waveforms, to thereby determine a load signature, said load signature being a function of characteristics of said load being supplied current via said solid state power switching device and operating conditions of said solid state power switching device;

determining a switching state of said solid state switching device;

comparing the measured load current with the load signature as a function of the determined switching state of said solid state switching device; and outputting an arc fault indication signal when the measured current is outside an allowable range of said load signature.

10. The method according to claim 9, wherein said load signature is a function of a switching state of said solid state power switching device, such that said load signature tracks transient conditions of said electrical power distribution system.

11. The method according to claim 9, wherein said load signature is a function of the type of power being supplied to said load via said solid state switching device.

12. A method for protecting against arc faults in an electrical power distribution system of a vehicle, said method comprising:

obtaining a measurement of current being supplied to a load via a solid state power switching device of said electrical power distribution system;

obtaining reference steady state and transient characteristics of the load supplied current waveforms, to thereby determine a load signature, said load signature being a function of characteristics of said load being supplied current via said solid state power switching device and operating conditions of said solid state power switching device;

comparing the measured load current with the load signature; and outputting an arc fault indication signal when the measured current is outside an allowable range of said load signature, wherein said step of obtaining a load current measurement obtains a measurement of current being supplied to a plurality of loads via corresponding solid state switching devices; and said comparing step compares total measured load current with the load signature, which is a function of characteristics of said plurality of loads, wherein, when said comparing step detects an anomaly, said method determines which one of the attached solid state switching devices reports an abnormal current to determine arc fault location.

13. The method according to claim 9, wherein said electrical power distribution system is an aerospace electrical power distribution system.

14. The method according to claim 9, wherein said step of obtaining a load signature determines transient and steady state characteristics of said load during an initialization process so as to determine said load signature.

15. The method according to claim 9, wherein said step of obtaining a load signature accesses a pre-programmed load signature.

* * * * *